Jan. 19, 1954

L. E. TAYLOR 2,666,638

CALENDAR HANDLING MACHINE

Filed March 13, 1947

INVENTOR:
LOUIS E. TAYLOR,
By Kingsland, Rogers & Ezell
ATTORNEYS.

Jan. 19, 1954      L. E. TAYLOR      2,666,638
CALENDAR HANDLING MACHINE Filed March 13, 1947      6 Sheets-Sheet 5

INVENTOR:
LOUIS E. TAYLOR,
BY Kingsland, Rogers & Ezell
ATTORNEYS.

Patented Jan. 19, 1954

2,666,638

UNITED STATES PATENT OFFICE 2,666,638

CALENDAR HANDLING MACHINE

Louis E. Taylor, Maplewood, Mo.

Application March 13, 1947, Serial No. 734,430

18 Claims. (Cl. 270—53)

The present invention relates generally to machines for automatically handling and performing operations upon uniform materials, and more particularly to a machine for automatically handling uniform items, such as calendar pads and calendar backs, prior to and during stitching, and for subsequently stacking the stitched items in piles.

An object of the present invention is to provide a novel machine particularly adapted for automatically prehandling calendar pads and calendar backs, stitching the same together, and stacking the stitched item in piles of predetermined number.

Another object is to provide a novel machine for automatically handling calendar pads and calendar backs in stitching the same which incorporates a novel calendar back feed mechanism for quickly and efficiently moving the calendar backs into stitching relation to the calendar pads.

Another object is to provide a novel machine for automatically handling calendar pads and calendar backs in stitching the same which incorporates novel mechanism for handling the stitched items to insure stacking of the finished item in bundles of predetermined number.

Another object is to provide a novel efficient automatic calendar back and calendar pad handling machine which operates with precision in disposing the back and pad for stitching and at high speed.

Another object is to provide a novel machine for automatically handling calendar pads and calendar backs in stitching the same which is fully automatic in operation and which only requires as preliminary operations that the calendar pads and calendar backs be separately disposed in provided holders.

Another object is to provide a novel machine for automatically handling calendar pads and calendar backs in stitching the same which attains a high speed of operation desirable in, but heretofore never attained by, any machines or combination of machines employed in the calendar stitching art.

Another object is to provide a novel machine for automatically handling calendar pads and calendar backs in stitching the same which incorporates novel feed mechanism for disposing the calendar pads in stitching relation to calendar backs, and novel calendar pad feed mechanism.

Another object is to provide a novel machine for automatically prehandling and stitching calendar pads to calendar backs and for handling the stitched units thereafterwards incorporating novel counting and stacking mechanisms.

Another object is to provide a novel calendar handling machine which feeds both calendar backs and calendar pads from the bottom of stacks to a stitching station.

Other objects are to provide a novel machine for automatically handling calendar pads and calendar backs in stitching the same which is relatively simple in its over-all construction, thereby facilitating maintenance and insuring long operation with minimum maintenance, which may be readily handled by an operator with maximum efficiency after minimum instruction, which is compact, and which is efficient and economical to operate.

The foregoing and other objects and advantages are apparent from the following description taken with the accompanying drawings, in which.

Referring to the drawings more particularly by reference numerals, 40 indicates generally a machine particularly adapted to handle calendar backs and calendar pads during the individual feeding, stitching, and stacking sequence. Broadly speaking, the machine 40 comprises a calendar back receiving and metering mechanism 42 which includes a calendar back receiving station and a calendar back pickup station, calendar back pickup and transfer mechanism 44, calendar pad receiving and feeding mechanism 46 which includes a calendar pad receiving station, stitched calendar pad and back unit receiving and counting mechanism 48 including a calendar unit counting and substacking station, stitched calendar pad and back unit stacking mechanism 50 including a calendar unit group stacking station, a suitable supporting frame 52 carrying and co-ordinating the several mechanisms, and interconnecting and correlating elements, together with suitable power mechanisms. The calendar backs and pads are fed to a stitching station.

The supporting frame 52 is shown as comprising two frame sections 54 and 55 which are connected to form a sturdy unitary construction by two pairs of superposed strap members 56 and 57 at each side of the sections 54 and 55 by suitable rivets 58, or the like (Figs. 1–4). The frame section 54 includes a base 60 secured to a foundation 61 by suitable bolts 62. Four legs 63 extend upwardly from the base 60 and support integral horizontal longitudinally extending angle iron members 64. The section 55 includes a base 67 secured to the foundation 61 by suitable bolts 68. Extending upwardly from the base 67 are two legs 69, each of which supports an arm 70 of angle cross section, the upper surface of which is in the same plane with the members 64. It is manifest that the frame 52 may take any desired form, the particular configuration shown having been found convenient for supporting the several mechanisms comprising the machine 40.

Figure 1:
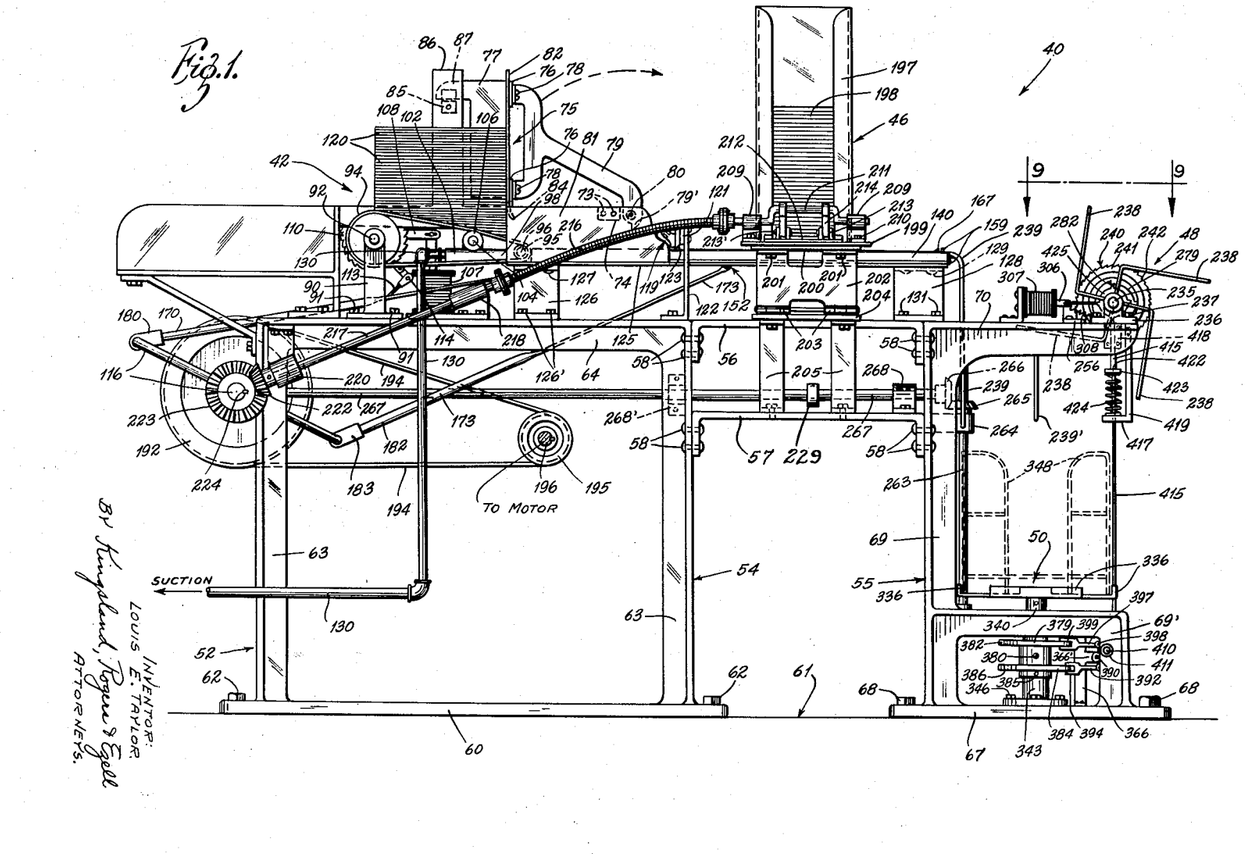
Fig. 1 is a side elevational view, parts being broken away for clarity, of a machine for automatically handling calendar elements prior to and during stitching of the calendar pads to the calendar backs and for subsequently handling the stitched units constructed in accordance with the teachings of the present invention.
Figures 2, 6, 7, 8, 8A:
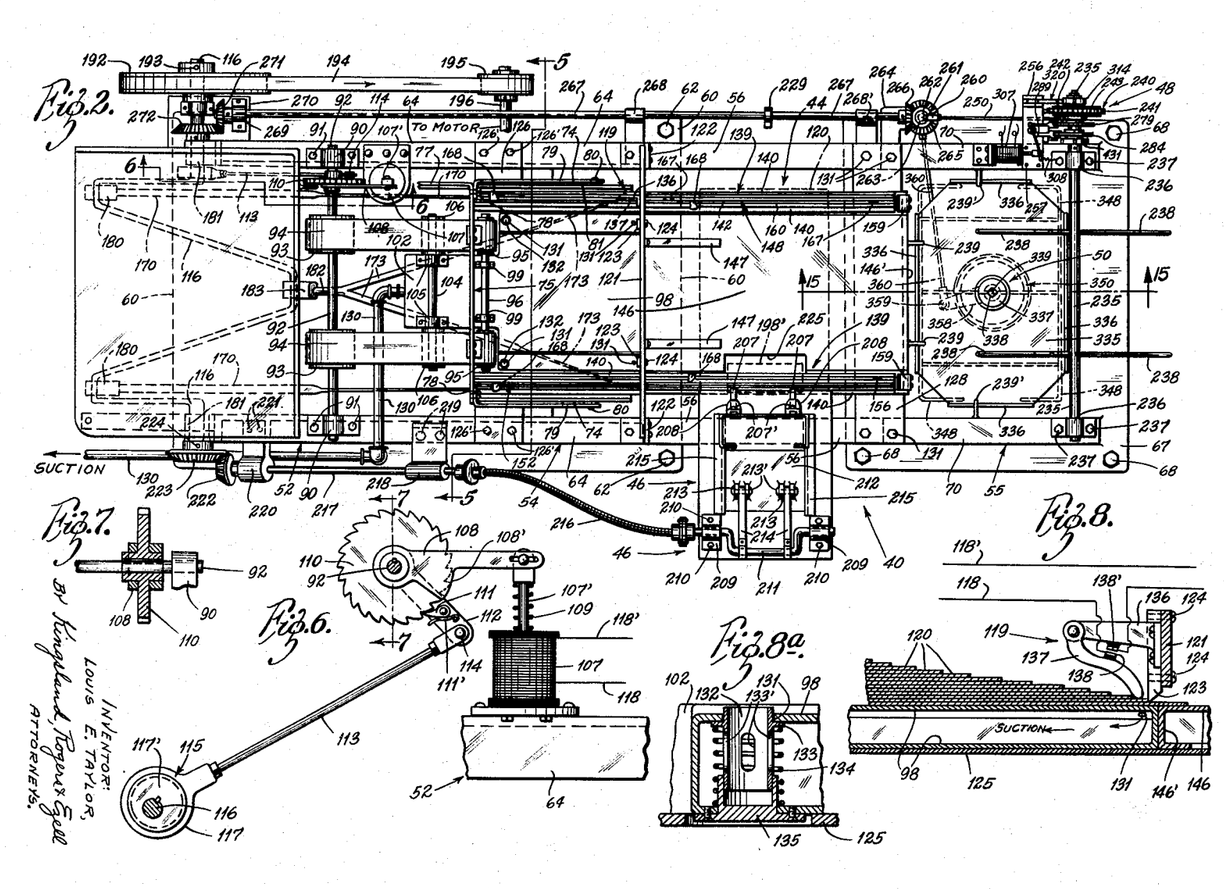
Fig. 2 is a plan view thereof, parts being broken away for clarity, and the calendar backs and calendar pads shown in Fig. 1 being omitted.
Fig. 6 is an enlarged fragmentary cross-sectional view taken on substantially the line 6—6 of Fig. 2.
Fig. 7 is a fragmentary cross-sectional view on the line 7—7 of Fig. 6.
Fig. 8 is a fragmentary vertical longitudinal cross-sectional view through the suction manifold showing the calendar back metering mechanism in side elevation.
Fig. 8a is an enlarged central vertical sectional view through one of the suction elements.
Figures 3, 28, 29, 30:
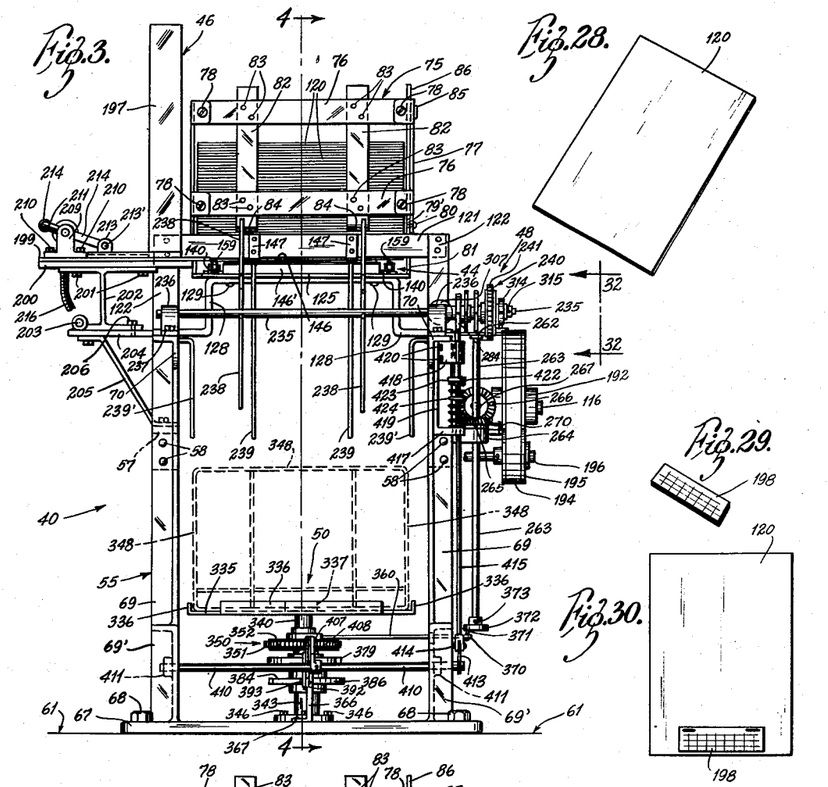
Fig. 3 is an end elevation thereof looking from right to left in Figs. 1 and 2.
Fig. 28 is an isometric view of a calendar back.
Fig. 29 is an isometric view of a calendar pad.
Fig. 30 is a plan view of the calendar pad of Fig. 29 stitched to the calendar back of Fig. 28.
Figures 4, 32:
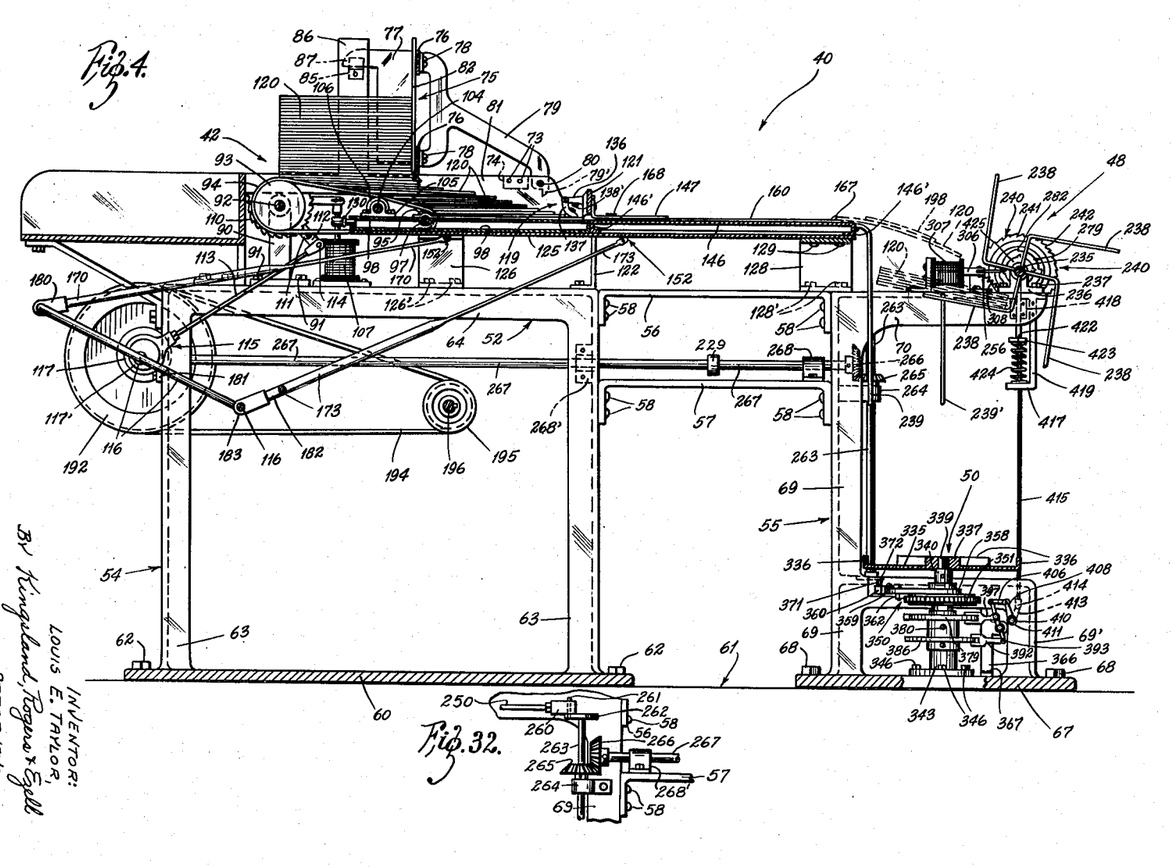
Fig. 4 is a vertical longitudinal cross-sectional view substantially on the line 4—4 of Fig. 3.
Fig. 32 is an enlarged fragmentary rear elevational view, taken on line 32—32 of Fig. 3, showing a driving connection for the calendar unit driving and release mechanisms.

The calendar back receiving and metering mechanism 42 includes a vertical calendar back receiving cage 75 of skeleton construction, including transverse straps 76 formed integral with a single side or wing panel 77 (Figs. 2 and 3). Extending forwardly from and secured to the straps 76 by suitable screws 78 are side arms 79 which are pivotally connected at 80 to vertical side panels 81 mounted on a plate 125 supporting the calendar back transfer mechanism 44 and more particularly described below. A stop member 74 is secured to the panel 81 adjacent the pivot 80 by screws 73, and is adapted to be engaged by the lower end 79' of the arm 79 to limit clockwise pivotal movement. Vertical straps 82 are secured to the transverse straps 76 by rivets 83, or the like, each strap 82 including a forwardly rounded lower end 84 (Figs. 1 and 4) for a purpose described below. The cage 75 is supported at its rear by a bracket 85 mounted on a vertical upright 86 supported on the frame section 54 which firmly receives a projection 87 of the panel 77 (Figs. 1, 3 and 4). The lower strap 76 rests on the panel 81 at the side remote from the panel 77.

Rearwardly of the cage 75 are spaced bearing brackets 90 supported on and secured to the members 64 of the frame section 54 by suitable bolts 91 (Figs. 1 and 2). The bearing brackets 90 rotatably receive the ends of a shaft 92. Secured to the shaft 92 for rotation therewith are two small drums 93 about each of which is mounted one end of an endless belt 94. The forward end of each belt 94 is received by a roller 95 rotatably mounted on a shaft 96 mounted in a transverse channel 97 formed in a reduced extension 102 of a flat suction casing 98 more particularly described below (Figs. 2 and 4). Suitable brackets 99 secured to the upper surface of the casing 98 maintain the shaft 96 in place. It is to be noted that the reduced extension 102 extends between the belts 94. A third shaft 104 is disposed in bearings 105 supported on the extension 102. An idler roller 106 is rotatably mounted at each end of the shaft 104 in contact with the undersurface of the adjacent belt 94. The idler 106 keeps the belts 94 from sagging and is of importance in preventing calendar backs from clogging and jamming the opening below the cage 75.

At the right end of the shaft 92 is a ratchet wheel 110 secured thereto by a setscrew, or the like (Figs. 1–4, 6 and 7). A wide dog 111 is pivotally mounted on an arm 112 pivotally supported on the shaft 92 adjacent the ratchet wheel 110. The dog 111 is spring pressed into engagement with the ratchet wheel 110 by a spring 111'. A rod 113 is pivotally connected at 114 to the free end of the arm 112 and at its other end is connected to an eccentric 115 which is operatively mounted on a crank shaft 116 (Fig. 5) more particularly described below, the eccentric 115 including a housing 117 within which is rotatably mounted an off-center member 117' secured to the crank shaft 116 for rotation therewith. It is manifest that the eccentric 115, through the aforesaid elements, effects rotation of the ratchet wheel 110 and therethrough movement of the continuous belts 94. In Figs. 1, 3 through 5, and 8, calendar backs 120 are shown stacked on the belts 94 with the lower calendar backs 120 moved forwardly into position on the flat casing 98.

Means is provided for automatically rendering the rotation of the dog 111 ineffective to rotate the ratchet wheel 110 to prevent too many calendar backs 120 from piling up on the flat casing 98. It is undesirable, from an excess weight standpoint, to have a large number of calendar backs 120 piled on the casing 98, since the bottom calendar back 120 is moved each time forwardly from underneath those above. Adjacent the ratchet wheel 110 and secured to a longitudinal member 64 of the frame section 54 is a solenoid 107 having a vertically extending plunger 107' which is pivotally connected to a free extension of a shield 108 which is pivotally mounted on the shaft 92 adjacent the ratchet wheel 110 (Figs. 2, 6 and 7). The shield 108 includes an enlarged portion 108', the outer edge of which is formed on a radius slightly greater than the maximum radius of the teeth of the ratchet wheel 110. An expanding coil spring 109 surrounds the plunger 107' and biases it and the connected shield 108 into their upward positions shown in Fig. 6. The spring-pressed dog 111 is wide enough to engage the arcuate portion of the enlargement 108' of the shield 108 when this arcuate portion 108' is rotated clockwise by the action of the plunger 107' into its lowermost position to render it ineffectual to drive the ratchet wheel 110. If desired, the arcuate enlarged portion 108' may be formed with an arcuate flange overlying the teeth of the ratchet wheel 110 which will be engaged by the dog 111 when moved downwardly from the position shown in Fig. 6. Leads 118 and 118' connect the solenoid 107 into a source of electrical energy. In Fig. 8 is shown in detail a switch 119 which controls the solenoid 107.

Forwardly of the side panels 81 is a transversely disposed bar 121 secured to vertical legs 122 secured to and mounted on the upper surface of the longitudinal members 64 (Figs. 1-4 and 8). Spaced vertical blades 123 are secured to the bar 121 for vertical adjustment by means of suitable screws 124 and slots in the bar 121. It is to be noted that the lower ends of the blades 123 are beveled to present sharp contact edges. A bracket 136 is secured to the bar 121 and extends rearwardly therefrom which supports the switch 119. The switch 119 includes a lever arm 137 pivotally connected to the free end of the bracket 136 which swings freely therefrom by gravity action, although a spring may be employed biasing the arm 137 clockwise (Fig. 8). The arm 137 carries an electrical contact 138 which is adapted to close with a contact 138' carried by the bracket 136. The contacts 138 and 138' are insulated from their supports. The contacts 138 and 138' are connected into the lead line 118 and are adapted to close the circuit comprising the lead lines 118 and 118' to energize the solenoid 107, as is more particularly set forth below. The free end of the arm 137 is engaged by the forward edges of calendar backs 120 and is adapted to close the circuit of the solenoid 107 to stop the forward feeding of the calendar backs by the ratchet wheel 110 when the calendar backs on the flat casing 98 reach a predetermined thickness.

The above-mentioned flat casing 98 has the main portion thereof forwardly of the partition 75, as is clear from Fig. 2. The casing 98 is disposed on a plate 125, which is supported at its rear end by spaced Z brackets 126, being secured thereto by suitable rivets or bolts 127 (Figs. 1 and 5), and at its forward end by a U bracket 128, being secured thereto by rivets or bolts 129 (Figs. 1 and 4). The Z brackets 126 and U brackets 128 are secured to the upper flanges of the longitudinal members 64 by suitable bolts 126' and 128', respectively. A pipe 130 of suitable diameter is tapped into the rear wall of the extension 102 of the casing 98 (Figs. 2 and 4), which leads to a suitable suction device, such as a pump, or the like (not shown). In the upper wall of the main portion of the casing 98 are spaced openings 131 (Figs. 2 and 8a) for a purpose described below. Within the rear pair of apertures 131 of the casing 98 are vertically reciprocable cylinders 132, each having a flange 133 to limit upward movement and openings 133' to permit a suction to be drawn. A spring 134 maintains each cylinder 132 with a portion extending above the adjacent surface of the casing 98. A guide cup 135 is provided to insure vertical movement. With a suction applied to the casing 98 and calendar backs 120 on the upper surface thereof, the cylinders 132 will draw the lowermost calendar back 120 downwardly away from the calendar back 120 immediately above to permit it to be picked up and moved forwardly by the calendar back pickup and transfer mechanism 44.

The calendar back pickup and transfer mechanism 44 is best illustrated in detail in Figs. 19 through 27, the plan layout being clearly shown in Fig. 2. The transfer mechanism 44 includes two duplicate sets 139 of pickup elements, one at each side of and supported on the plate 125. Therefore, only one set of pickup elements 139 is described in detail. Each set 139 of pickup elements includes a pair of spaced opposed angle members 140 which extend longitudinally along the plate 125 near the edge thereof and are secured thereto (Figs. 22-25). In the vertical flange of each angle member 140 is a longitudinal groove 141. A vertical partition wall 142 (Figs. 24 and 27) is disposed midway between the vertical flanges of the angle members 140 and is secured to the plate 125 for support, the partition wall 142 having horizontal flanges 143. Hence, two elongated chambers 144 and 145 are formed by the vertical flanges of the angle members 140 and the partition wall 142. Between the two spaced pairs of angle members 140 forwardly of the casing 98 is a plate 146 mounted on the plate 125 and spaced therefrom by vertical flanges 146'. The plate 146 is in a plane to support calendar backs 120. Leak springs 147 are secured to the bar 121 and extend forwardly against the plate 146 to maintain calendar backs 120 thereagainst.

A composite calendar back pickup member 148 is disposed in each of the chambers 144 and 145 (Figs. 19-25). Each pickup member 148 includes an elongated base member 149 of the cross section shown having a rib 150 which slides in the groove 141 of the contiguous angle member 140. The bottom of the elongated base member 149 rests in part on the flange 143 of the partition wall 142. At the rear end of the base member 149 is a slot 151 in which is pivotally mounted a bell crank lever 152 on a pin 153. At the front end of the base member 149 is a slot 155 in which is pivotally mounted one end of a link 156 on a pin 157. An upper elongated member 160 of cross section shown is disposed above the base member 149, being pivotally mounted at the rear end on one arm 161 of the bell crank lever 152 by means of a pin 162 extending across a slot 163 therein, the free end of the arm 161 extending into the slot 163 and surrounding the pin 162. At the forward end of the upper elongated member 160 is a slot 165 in which is mounted a pin 166 which pivotally receives the free end of the link 156. The link 156 includes a pointed extension 167 which extends above the upper plane of the upper elongated member 160 when the composite member 148 has its elements in the position shown in Fig. 20. At the rear end of the upper elongated member 160 on the upper surface thereof is a calendar back pickup hook member 168 having a rounded-under leading shelf edge 169 pointed in plan to insure pickup. The hook member 168 has some width, as shown, to eliminate possibility of damaging the edges of calendar backs and to facilitate calendar back pickup. At the forward end of each of the pair of chambers 144 and 145 mounted on the angle members 149 is a spring 159 which is contacted by the upper elongated member 160 of each of the composite members 148 at a point substantially one-quarter of an inch before completing its full travel. In the return travel of the composite members 148, the spring 159 exerts spring pressure to maintain the upper member 160 in raised position for substantially one-quarter of an inch of its travel to insure backup of the hook member 168 in respect to the edge of a transferred calendar back 120 before dropping to lowered position to obviate possibility of damaging the edge of the immediately transferred calendar back 120 and to insure leaving it at the stitching station which must be the same point each time.

Means is provided for reciprocating the composite members 148. A rod 170 is pivotally connected by a pin 171 to the free end of the other arm 172 of the bell crank lever 152 of each of the outer composite members 148. A rod 173 is connected to the arm 172 of the bell crank lever 152 of each of the inner composite members 148. It is to be observed from Figs. 22 through 24 that the arm 172 of the bell crank lever 152 of each composite member 148 extends through a slot 175 in the plate 125. The lower end of each of the rods 170 is threadedly or otherwise secured to a bearing 180 rotatably mounted on or formed as part of the crank shaft 116, above mentioned, which is of the form clearly shown in Figs. 1, 2, 4 and 5, and is journaled in bearings 181 secured to the legs 63. Each rod 173 comprises one leg of a Y-shaped member 182 which is threadedly or otherwise secured to a centrally located bearing 183 rotatably mounted on or formed as part of the crank shaft 116. The bearings 180 and the bearings 183 are at one hundred and eighty degrees to each other and are of the same radius distance from the axis of rotation of the crank shaft 116. The effective lengths of the rods 170 and 173 are such that transfer of calendar backs 120 and calendar units by alternately acting pairs of composite members 148 is a constant time increment, provided the speed of rotation of the crank shaft 116 is constant.

Figures 5, 31:
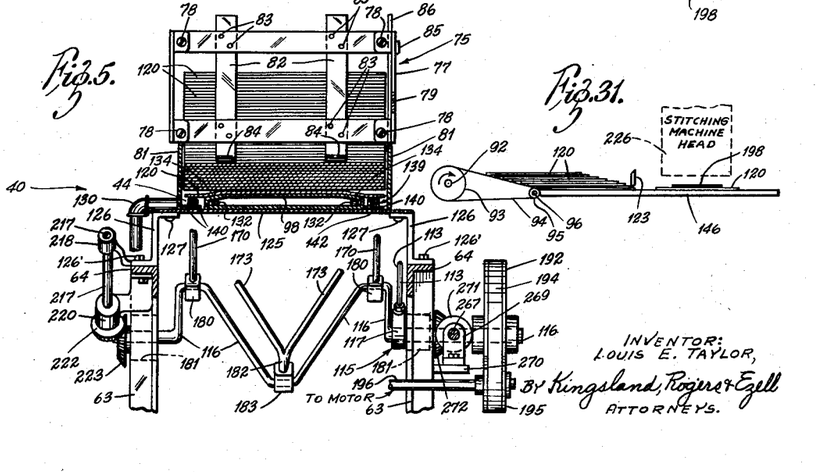
Fig. 5 is a fragmentary vertical transverse cross-sectional view substantially on the line 5—5 of Fig. 2.
Fig. 31 is a diagrammatic side elevational view showing the relationship of the stitching machine head, not shown in the preceding views, to the calendar pads and backs.

Power is supplied to the crank shaft 116 through a pulley 192 secured by a setscrew 193, or the like, to the free end of the crank shaft 116 at the right side of the machine 40 (Figs. 3 and 5). A continuous belt 194 engages the pulley 192 to transfer power from a smaller pulley 195 secured to a shaft 196 which is preferably driven by an electric motor (not shown), although, of course, any form of power may be employed to rotate the shaft 196.

The calendar pad receiving and feeding mechanism 46 is mounted adjacent to and at the outer side of the forward portion of one set of composite members 148, as is clear from Figs. 1–3. The mechanism 46 includes a vertically disposed cage or holder 197 of a configuration to snugly receive a stack of calendar pads 198. The cage 197 is mounted on and secured to a plate 199 which is adjustably and removably supported on and connected to a platform 200 by suitable screws and slots (not shown). The platform 200 is secured by bolts 201 to a bracket 202 of H cross section hingedly connected at 203 to a plate 204 secured to the strap member 56 by bolts or welding and reinforced by brace members 205. A bolt 206 anchors the bracket 202 to the plate 204. Leaf springs 207 are mounted in spring holders 208 by setscrews 207' secured to the cage 197 and bear against the plate 199, being adapted to hold the calendar pads in position during the stitching operation. Holders 208 prevent side distortion of the springs 207. To the rear of the cage 197 are spaced bearing brackets 209 secured to the plate 199 by suitable bolts 210. A crank shaft 211 is rotatively mounted in the bearing brackets 209. Between the crank shaft 211 and the base of the cage 197 is a thin pusher plate 212 having spaced pairs of lugs 213 secured to the upper surface thereof. Arms 214 are pivotally connected at one end to the center portion of the crank shaft 211 and at the other end to suitable bolts 213' supported by the lugs 213. Guides 215 are mounted on the plate 199 in which the pusher plate 212 reciprocates. The cage 197 includes a transverse slot in the rear wall at its base of a width and depth to permit a calendar pad 198 and the following pusher plate 212 to slide therethrough so that a calendar pad 198 may be pushed to the position shown in Fig. 2 by calendar pad 198' at each stroke of the plate 212. A flexible drive shaft section 216 is connected at one end to one end of the crank shaft 211 and at the other end to a drive shaft section 217, the drive shaft section 217 being rotatably supported at one end by a bracket 218 secured to the longitudinal member 64 by suitable bolts 219 and at the other end by a bracket 220 secured to the under side of the longitudinal member 64 by suitable bolts 221 (Figs. 1 and 2). At the free end of the drive shaft segment 217 is a beveled pinion 222 which is in driven engagement with a beveled gear 223 secured to the outer end of the crank shaft 116 by a setscrew 224, or the like. The teeth ratio of the pinion 222 and gear 223 is such as to rotate the former twice to once for the latter, since two calendar backs 120 are fed forwardly with each revolution of the crank shaft 116.

It is to be noted that the plate 199 overlaps the platform 200, which is of particular importance at the inner edges (Fig. 3), for the calendar backs 120 slide under the inner portion of the plate 199. In Fig. 2, a calendar back 120 is indicated in broken lines disposed in position to have the calendar pad 198' stitched thereto. The pad 198' is supported by the plate 199 during the stitching operation, overhanging the relatively thin plate 199, the springs 207 holding the pad 198' in position, and overhanging an opening 225 through the plate 146 and the adjacent angle member 140. A stitching machine which per se forms no part of the present invention is mounted adjacent the pad mechanism 46 with its stitching head 226 disposed over the position of the calendar pad 198', as shown in Fig. 2. It is to be understood that a portion of the stitching machine is disposed beneath the opening 225 to operate therethrough. The relationship of the stitching head 226 is shown in Fig. 31 diagrammatically. Opposite the mechanism 46 on a longitudinally positioned shaft, designated below as 267 in the description of the mechanism 48, is a cam 229 which trips the stitching machine in synchronization with the other operations of the machine 40. The interconnecting elements are not shown since the same are conventional.

The stitched calendar pad and calendar back unit receiving and counting mechanism 48 is disposed at the forward end of the machine 40 and is supported in the main by the frame section 55. A shaft 235 is rotatably mounted in bearing brackets 236 mounted on and secured to the arms 70 by suitable bolts 237 (Figs. 1 through 4). Intermediate the bearing brackets 236, the shaft 235 has secured thereto two spaced sets of four equally spaced wire or light rod members 238 bent at right angles, as clearly shown in the drawings, to form a pair of pin wheels of swastika shape. The two sets of members 238 and shaft 235 form a revoluble receiving device for calendar back and pad units, as is clearly indicated in Fig. 4. Depending rods 239 and 239', secured as by welding to the flange 146' of the plate 146 and the arms 70, respectively, define a calendar unit chute.

Mechanism is provided for counting a predetermined number of calendar back and pad units and for automatically rotating the shaft 235 through 90° as each calendar unit stack is completed to drop the stack into a waiting receptacle. In the mechanism shown, the selected number of calendar units per stack is twenty-five.

Figures 9, 10, 11, 12, 13, 14, 15, 16, 17, 18:
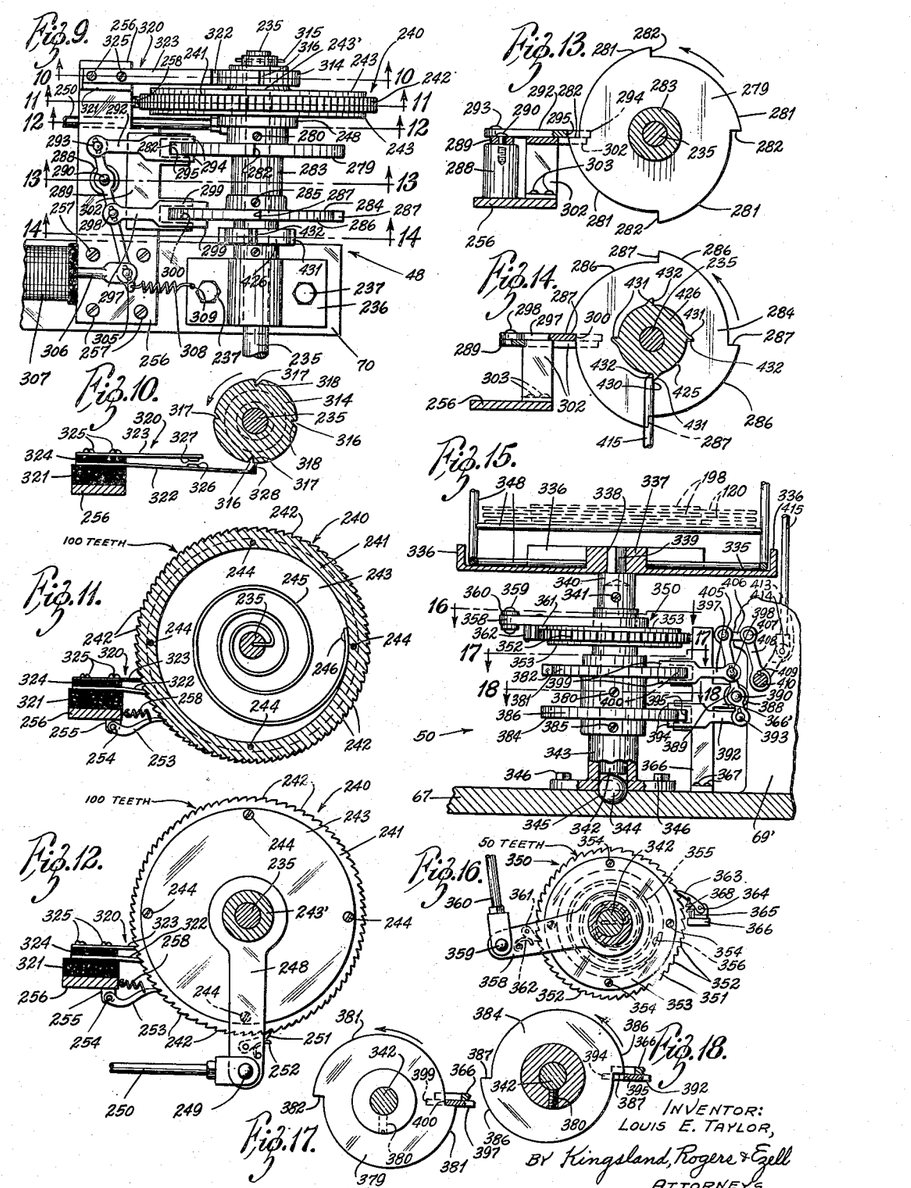
Fig. 9 is an enlarged partial plan view taken on the line 9—9 of Fig. 1 showing the mechanism for controlling calendar unit counting and release mechanisms.
Figs. 10 through 14 are vertical cross-sectional views on the lines 10—10 through 14—14, respectively, of Fig. 9.
Fig. 15 is an enlarged vertical cross-sectional view, partly in elevation, taken generally along the line 15—15 of Fig. 2 showing the mechanism for rotating the accumulating calendar units at predetermined times.
Figs. 16 through 18 are horizontal cross-sectional views taken on the lines 16—16 through 18—18, respectively, of Fig. 15.
Figures 19, 20:
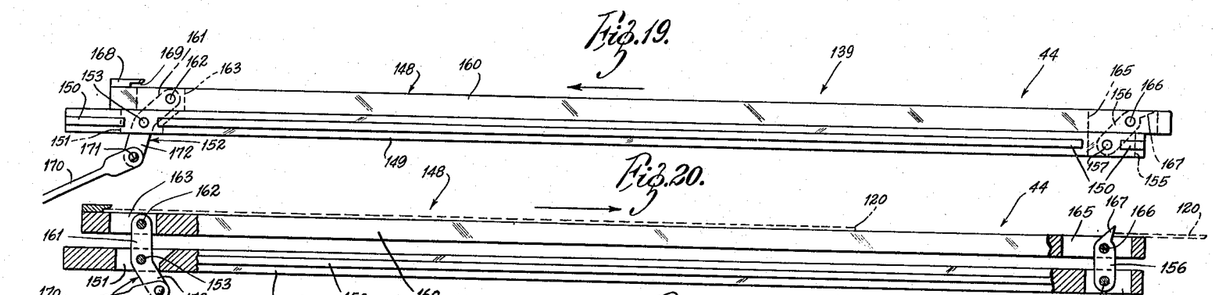
Fig. 19 is an enlarged side elevational view of one of the composite calendar back pickup members shown in the return position.
Fig. 20 is a view similar to Fig. 19, but partly in section, showing the said member in calendar back pickup and transfer position.

Referring more particularly to Figs. 2, 3 and 9 through 14, one mechanism for counting and dropping calendar units in stacks of predetermined number includes a composite drum 240 mounted on the shaft 235 comprising an outer ring 241 having one hundred teeth 242 around the outer periphery thereof (Figs. 11 and 12). The ring 241 is secured to and between a pair of disc plates 243 by suitable screws 244, or the like, the disc plates 243 having hubs 243' mounted on the shaft 235 for free rotation. Within the ring 241 and enclosed by the plates 243 is a heavy flat wound spring 245, the outer end of which is connected to the inner periphery of the ring 241 by a suitable screw 246 and the inner end of which is anchored in a slot in the shaft 235 for rotation therewith.

Adjacent the inner disc plate 243 is a radial arm 248 which is freely pivotally supported on the hub 243' thereof (Fig. 12). To the outer end of the arm 248 is pivotally connected at 249 one end of a rod 250. A dog 251 is pivotally supported on the arm 248 between the pivot 249 and the teeth 242 of the ring 241, and is spring pressed into engagement with the teeth 242 by a suitable spring 252. A second dog 253 is pivotally mounted at 254 on a bracket 255 secured to a plate member 256 which is mounted on the arm 70 and secured thereto by suitable screws 257 (Fig. 9). The dog 253 is biased by a spring 258 into engagement with the teeth of the ring 241 and is synchronized with the dog 251 to prevent clockwise movement of the ring 241 during clockwise movement of the dog 251. The rod 250 extends rearwardly from the pivot point 249 and includes at its rear end a head 260 longitudinally adjustable thereof (Fig. 2), having an aperture receiving a pin 261 extending upwardly from a disc 262 and outwardly from the axis of rotation thereof. The disc 262 is preferably formed integral with a vertical shaft 263 (Fig. 3) which has rotative bearing support in a bearing bracket 264 secured to one of the legs 69 of the frame section 55. A beveled gear 265 is secured to the vertical shaft 263 for rotation therewith and is engaged by a beveled gear 266 secured to the forward end of a driven shaft 267 rotatably mounted in bearing brackets 268 and 268' secured to a strap member 57 and leg 63, respectively, and in a bearing bracket 269 mounted on a supporting plate 270 which is secured to the adjacent rear leg 63 of the frame section 54 by suitable rivets, or the like. To the rear end of the shaft 267 is secured a beveled gear 271 for rotation therewith, which meshes with a beveled gear 272 secured to the crank shaft 116 for rotation therewith. The teeth ratio of the gears 271 and 272 is such that the former makes two revolutions to one of the latter, since two calendar backs 120 are moved forwardly by the mechanism 44 for each revolution of the crank shaft 116. The connection between the rod 250 and the head 260 is adjusted so that one revolution of the disc 262 rotates the ring 241 counterclockwise one tooth (Fig. 12). The rotating mechanism is synchronized with the calendar unit transfer mechanism so that there is a rotation of the ring 241 one tooth for each calendar unit dropped onto the members 238.

Adjacent the arm 248 is a cam wheel 279 which is secured to the shaft 235 by a setscrew 280 for rotation therewith. The cam wheel 279 includes four peripheral cams 281 which terminate in offset radial shoulders 282 (Fig. 13). Spaced from the cam wheel 279 by a sleeve 283 is a second cam wheel 284 which is secured to the shaft 235 by a setscrew 285 for rotation therewith. The cam wheel 284 includes four peripheral cams 286 (Fig. 14) terminating in offset radial shoulders 287, the cams 286 being opposed to the cams 281 of the cam wheel 279, as is clear from a comparison of Figs. 13 and 14. Mounted centrally of the cam wheels 279 and 284 and spaced outwardly therefrom is a post 288 which is supported by and secured to the plate 256. A lever 289 is pivotally mounted on the post 288 by a screw 290 a short distance inwardly of one end thereof (Fig. 9). A fork 292 is pivotally connected to the free end of the lever 289 at 293 and has legs 294 extending along the two faces of the cam wheel 279 and a bight 295 disposed for engagement with the peripheral cams 281 thereof. A fork 297 similar to the fork 292 is pivotally connected at 298 to the lever 289, the pivot point 298 being the same distance from the pivotal axis of the lever 289 as is the pivot point 293. The fork 297 includes legs 299 which straddle the cam wheel 284 and a bight 300 which is adapted to be engaged by the shoulders 287 thereof. Beneath the forks 292 and 297 and supporting the same is a bracket 302 which is secured to the plate 256 by rivets 303, or the like. The bracket 302 extends forwardly in straddling relation to the cam wheels 279 and 284 in order to receive the full impact of a shoulder 287 of the latter and the frictional drag of the former during the operation of the device.

The other end of the lever 289 is pivotally connected at 305 to a plunger 306 of a solenoid 307. A spring 308 has one end anchored to a post 309 secured to the bearing bracket 236 and the other end connected to the lever 289 adjacent the pivot connection 305 which biases the lever 289 towards the position shown in Fig. 9. The energizing mechanism for the solenoid 307 is shown in Fig. 10 and includes a disc 314 mounted about the free end of the shaft 235 and secured to the outer plate 243 of the composite drum 240 by any preferred means for rotation therewith. A cotter pin 315 insures retention on the shaft 235 of the several elements. In the periphery of the disc 314 are four equally spaced notches 316, one wall 317 of which is radial and the other wall 318 of which is disposed at an angle to the radial wall 317, as is clear from Fig. 10. A switch 320 is supported on the plate 256 on an insulation block 321 adjacent the disc 314, and includes a lower resilient blade 322 having one end disposed on the insulation block 321 and an upper resilient blade 323 spaced from the blade 322 by an insulation block 324. Suitable screws 325 hold the blades 322 and 323 together and secure them and the block 321 to the plate 256. The blade 322 carries a contact 326 and the blade 323 a contact 327. The outer end of the blade 322 is formed as a head 328 of nonconductive material which approximates in cross section the notches 316 of the disc 314 in order to drop thereinto in interfitting relation. It is manifest that the switch 320 and disc 314 construction provides momentary closing of the contacts 326 and 327 to energize the solenoid 307, and subsequent break thereof to deenergize, the full operation being set out below.

The calendar unit stacking mechanism 50 is disposed beneath the calender unit receiving and counting mechanism 48 and includes a platform 335 having four opposed side flanges 336 (Figs. 1 through 4 and 15 through 18). The platform 335 includes a central boss 337 having a square opening 338 therethrough which receives a square reduced extension 339 of a socket member 340. The socket member 340 is secured by a setscrew 341 to the upper end of a vertically disposed shaft 342 which is rotatably mounted in the open end of a suitable bearing bracket 343 and rests on a ball 344 disposed in the bearing bracket 343 and seating in a suitable cavity 345 formed in the base 67 of the frame section 55. The bearing bracket 343 is anchored to the base 67 by suitable bolts 346. The platform 335 supports a removable wire basket 348 of suitable form permitting both ready removal of the basket 348 from the platform 335 and removal of the calendar units from the basket 348.

Mechanism is provided for rotating the platform 335 through one hundred and eighty degrees between deposits therein of counted stacks of calendar units in order to alternate the calendar pad ends of the groups of calendar units to achieve a balanced pile of calendar units, which is similar to and is synchronized with the mechanism described above provided for counting and dropping the calendar units in stacks. A composite drum 350 (Fig. 16) similar to the composite drum 240 is provided which comprises an outer ring 351 having fifty teeth 352 around the outer periphery thereof. The ring 351 is secured to a pair of disc plates 353 by suitable screws 354, or the like, the disc plates 353 being mounted on the shaft 342 for free rotation. Within the ring 351 and enclosed by the plates 353 is a heavy wound spring 355, the outer end of which is connected to the inner periphery of the ring 351 by a suitable screw 356 and the inner end of which is anchored in a slot in the shaft 342 for rotation therewith. Adjacent the upper disc plate 353 is an arm 358 which is pivotally supported on the hub of the plate 353. To the outer end of the arm 358 is pivotally connected at 359 one end of a rod 360. A dog 361 is pivotally mounted on the arm 358 between the pivot 359 and the teeth 352 of the ring 351, and is spring pressed into engagement with the teeth 352 by a suitable spring 362. A second dog 363 (Fig. 16) is pivotally mounted at 364 on a bracket 365 supported on the upper end of a vertical plate 366 secured to the base 67 by suitable rivets 367, or the like. The dog 363 is spring pressed into engagement with the teeth 352 of the composite drum 350 by a spring 368 and is synchronized in position with the dog 361 to prevent backup of the ring 351 during counterclockwise movement of the arm 358 and the dog 361 (Fig. 16). The rod 360 extends from the pivot point 359 laterally and includes at its free end an apertured head 370 which is disposed about a headed pin 371 extending downwardly from a disc 372 and positioned outwardly from the axis of rotation thereof (Fig. 3). The disc 372 is secured to the lower end of the vertical shaft 263 by a setscrew 373 for rotation therewith. It is manifest that rotation of the shaft 263 and consequent rotation of the disc 372 effects clockwise rotation of the ring 351 through engagement of the teeth 352 thereof by the dog 361 (Fig. 16).

Below the composite drum 350 is a cam wheel 379 (Fig. 17) which is secured to the shaft 342 by a setscrew 380 for rotation therewith. The cam wheel 379 includes two peripheral cams 381 which terminate in offset radial shoulders 382. Directly beneath the cam wheel 379 is a second cam wheel 384 (Fig. 18) which is secured to the shaft 342 for rotation therewith by a setscrew 385. The cam wheel 384 includes two peripheral cams 386 terminating in offset radial shoulders 387 which are opposed in relationship to the cams 381 of the cam wheel 379, as is clear from comparison of Figs. 17 and 18. Mounted centrally of the cam wheels 379 and 384 and spaced therefrom is a post 388 which is bolted by and secured to an offset portion 366' of the vertical plate 366. A lever 389 is pivotally mounted on the post 388 by a suitable screw 390 a short distance inwardly of one end thereof. A fork 392 is pivotally connected to the free end of the lever 389 at 393 and has legs 394 extending along the two faces of the cam wheel 384 and a bight 395 disposed for engagement with the peripheral cams 386 thereof. A fork 397, similar to the fork 392, is pivotally connected at 398 to the lever 389, the pivot point 398 being the same distance from the pivotal axis of the lever 389 as is the pivot point 393. The fork 397 includes legs 399 which straddle the cam wheel 379 and a bight 400 which is adapted to be engaged by the shoulders 382 thereof. The forks 392 and 397 are supported by the plate 366, which is formed in its upper portion to straddle both of the cam wheels 379 and 384 in order to receive the full impact of a shoulder 382 and the frictional drag of a cam 386 during the operation of the device. The plate 366 may be in any wise suitably braced in order to prevent give thereof.

Mechanism is provided for coordinating the release of the stacking mechanism 50 with the release of the calendar unit receiving and counting mechanism 48 (Figs. 3, 4, 9, 14 and 15). The free end of the lever 389 is pivotally connected at 405 to a link 406 which is, in turn, pivotally connected at 407 to the free end of an arm 408 secured by a setscrew 409 or spline to a rock shaft 410 rotatably mounted in suitable bearing bosses 411 formed in short legs 69' of the frame section 55. To one end of the rock shaft 410 is secured an arm 413 for rotation therewith. The arm 413 is pivotally connected at 414 to the lower end of a vertical rod 415. The upper end of the rod 415 extends through apertures in spaced arms 417 and 418 of a bracket 419 (Fig. 3) secured by suitable bolts 420 to the arm 70 of the frame section 55. Between the arms 417 and 418, the rod 415 includes a shoulder 422 against which is disposed a washer 423, one end of a compression spring 424 being disposed against the washer 423 and the other end against the arm 417, thereby biasing the rod 415 upwardly into engagement with the periphery 425 of an actuator wheel 426 (Figs. 3 and 14). The upper end of the rod 415 includes a flat surface 430 which is disposed radially of the actuator wheel 426. The periphery of the actuator wheel 426 includes four equally spaced cams 431 which terminate in radial shoulders 432. It is manifest that the cams 431 effect downward movement of the rod 415 which rocks the rock shaft 410 and therethrough releases the calendar unit stacking mechanism 50 to permit rotation of the shaft 342 through one hundred and eighty degrees under the action of the spring 355. The relationship of the radial shoulders 432 and the flat surface 430 of the rod 415 immediately releases the rod 415 after it has tripped the calendar unit stacking mechanism 50 so that the elements of the calendar unit stacking mechanism 50 may return to their initial relationship.

*Operation*

The operation of the machine 40 is clear from the foregoing description taken with the drawings, but a running description is helpful to a more complete appreciation thereof. Broadly, after calendar backs 120 are stacked in the receiving and metering mechanism 42 and calendar pads 198 are stacked in the pad receiving and feeding mechanism 46, once power is turned on, the machine 40 automatically moves calendar backs 120 and calendar pads 198 into superposed relation where they are stitched together, and then moves the calendar units into a basket in substacks of predetermined number, such as twenty-five units, the sub-stacks being alternately disposed at one hundred and eighty degrees to each other in order to effect an even full stack. Feeding of both calendar backs 120 and calendar pads 198 is from the bottom of stacks which eliminates refill stoppages and insures continuous operation of the machine 40.

Figures 21, 22, 23, 24, 25, 26, 27:
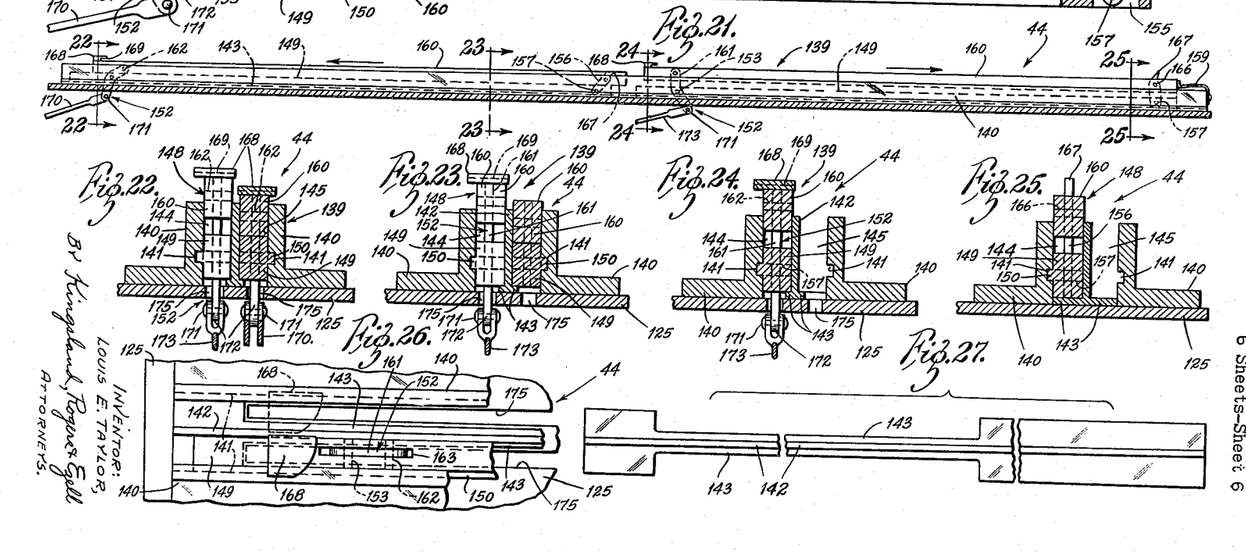
Fig. 21 is a vertical longitudinal sectional view through the calendar back transfer mechanism support, showing one set of composite calendar back pickup members in side elevation.
Figs. 22 through 25 are enlarged vertical transverse cross-sectional views taken substantially on the lines 22—22 through 25—25, respectively, of Fig. 21.
Fig. 26 is an enlarged fragmentary plan view of the left hand portion of the construction shown in Fig. 21.
Fig. 27 is an enlarged plan view of the central partition wall which divides each pair of composite members.

More specifically, assuming that the calendar back receiving mechanism 42 and the calendar pad receiving mechanism 46 are supplied with calendar backs 120 and calendar pads 198, which supplies are maintained either manually or by some automatic means, energization of the power motor (not shown) will throw into operation all of the above-described mechanisms of the machine 40. The related suction pump (not shown) draws a vacuum upon the casing 98 by the pipe 130, which is effective upon the lowermost calendar back 120 (Figs. 5 and 8), the forward openings 131 maintaining the lowermost calendar back 120 pressed against the surface of the casing 198 so that the forward edge thereof will clear the blades 123 when the calendar back 120 is moved forwardly. The rearwardly disposed cylinders 132 are effective to draw the rear edge of the lowermost calendar back 120 into the position shown in Fig. 5 across the rear portions of the sets 139 of pickup elements of the calendar back pickup and transfer mechanism 44. It should be noted that calendar backs are usually formed of cardboard, which will deform as stated and shown. The thus drawn down rear edge of the lowermost calendar back 120 is engaged by the hook members 168 of a composite member 148 at each side of the machine 40. The composite members 148 are moved forwardly through the power rotation of the crank shaft 116 to which the reciprocating driven rods 170 and 173 of the composite members 148 are connected. It is clear from the detailed description above that, in respect to each set 139 of composite pickup members 148, the members 148 alternate in moving forwardly and in returning for pickup action through the medium of their reciprocating rods 170 and 173, respectively. In Fig. 21, a set of composite members 148 is shown with the one at the left in lowered position at the end of its return stroke and about to be raised into pickup position for a forward stroke, and with the one at the right at the backed-up forward limit of the transfer stroke in raised position just prior to collapsing for the return stroke. The pivotal action of the bell crank lever 152 of each composite member 148 plus the inertia of the base member 149 (a spring clip may be used to physically hold the member 160) insure the upper member 160 moving to raised position on the forward transfer stroke prior to forward movement of the base member 149. On the return stroke, the spring 159 acts as a back-up stop for the upper member 160 so that the base member 149 starts its return substantially simultaneously with the lowering movement of the upper member 160. The lowered position is necessary to return the composite member 148 beneath the calendar backs 120 distributed along the machine 40.

As stated, the hook members 168 of the composite members 148 in the rear positions move into contact with the rear edge of the lowermost calendar back 120 and move it forwardly beneath the metering blades 123 into position opposite the calendar pad receiving and feeding mechanism 46, as is indicated in broken lines in Fig. 2. Simultaneously, the crank shaft 211 is actuated through its driving mechanism including the flexible drive shaft section 216 and the drive shaft section 217 which takes power from the driven beveled gear 223, and reciprocates the pusher plate 212 to push the bottom calendar pad 198 across the plate 199 into the position indicated at 198' in Fig. 2. In this position, the calendar pad 198' overhangs the calendar back 120, indicated in broken lines, which has just been moved into this position by the pickup and transfer mechanism 44, and also overhangs about one-quarter inch of the openings 225. The pad 198' is stitched to the calendar back 120 by the stitching machine, the head 226 of which is indicated diagrammatically in Fig. 31. It is to be noted that the calendar back 120 moves beneath the plate 199, being supported on the plate 146 and the composite members 148, the springs 147 holding the calendar back 120 in position, and the springs 207 performing the same function in respect to the calendar pad 198'. Immediately the stitching operation is completed, the other composite member 148 of each set, through contact of the pointed extensions 167 with the rear edge of the calendar unit, moves the stitched calendar unit forwardly off of the plate 146 onto the waiting rod members 238. It must be appreciated that, as a pair of composite members 148 moves a stitched calendar unit forwardly from the stitching station, a calendar back 120 is being simultaneously moved forwardly from above the casing 98 to the stitching station. Hence, there is a continuous flow of calendar backs and calendar units from the surface of the casing 98 to the stitching station, and from the stitching station onto the rod members 238.

As each calendar unit is moved onto the rod members 238, the counting mechanism is actuated to move the composite counting drum 240 a distance of one tooth (Figs. 2 and 12), the particular power sequence for moving the drum 240 including the dog 251, the arm 248, the rod 250, the vertical shaft 263 (Fig. 3) with its disc 262 and offset pin 261, the meshing beveled gears 265 and 266, the shaft 267, and the meshing beveled gears 271 and 272, the latter of which is secured to and rotated by the crank shaft 116. As soon as a predetermined number of calendar units has been deposited upon the rod members 238, here selected as twenty-five calendar units, the switch 320 (Figs. 9 and 10) is closed by the head 328 of the blade 322 thereof dropping into a notch 316 of the disc 314, which is secured to and rotates with the toothed ring 241. The contacts 326 and 327 are closed, which energizes the solenoid 307, thereby moving the plunger 306 thereof inwardly or to the left (Fig. 9), which pivots the lever 289 clockwise to withdraw the bight 300 of the fork 297 from engagement with the shoulder 287 of the cam disc 284. The spring 245 in the drum 240 thereupon effects counterclockwise rotation of the shaft 235 through ninety degrees which rotates the rod members 238 through ninety degrees and dumps the stack of twenty-five calendar units into the basket 348. Immediate reset of the mechanism is effected by the fact that the contacts 326 and 327 are at once separated by the continued rotation of the ring 241, which also rotates the disc 314 secured thereto to move the head 328 out of the notch 316. Hence, the lever arm 289 is immediately free to pivot under the action of the spring 308 and the effect of the cam surface 281 of the cam disc 279 on the bight 295 of the fork 292. It is to be noted that, as the fork 297 is moved free of the shoulder 287, the fork 292 is moved into engagement with the initial portion of a cam 281 of the cam disc 279, the camming action of the cam 281 against the bight 295 of the fork 292 as the cam disc 279 is rotated by the spring 245 pivoting the lever 289 to dispose the bight 300 of the fork 297 in the path of the next shoulder 287 of the cam disc 284.

The basket 348 receiving the calendar units is rotated automatically through one hundred and eighty degrees after receiving each sub-stack of calendar units in order to dispose the pads 198 thereof at alternate ends of the basket 348. The mechanism for achieving this automatic rotation of the basket 348 is mounted beneath the basket 348 and is similar to that for counting the calendar units and dropping them into the basket 348. The rod 415 (Figs. 14 and 15) is reciprocated by the cams 431 on the actuator wheel 426, which actuation is in timed relation with the counting and stacking mechanism 48 so that the basket 348 is rotated immediately after receiving a stack of calendar units. The rod 415 rotates the rock shaft 410 clockwise (Fig. 15) to pivot the forks 397 and 392 to release the cam wheel 379, whereupon the vertical shaft 342 which supports the basket 348 on a platform 335 is rotated through one hundred and eighty degrees under the action of the spring 355 which has previously been wound from the rotative action of the aforesaid shaft 263 (Fig. 3), the disc 372 and its pin 371, the rod 360, the dog 361 and the ring 351. It is to be noted that the flat surface 430 of the rod 415 cooperates with the radial surface of the shoulders 432 to permit immediate reset action of the forks 392 and 397 in relation to the cam discs 384 and 379, respectively.

It is to be observed that there is a constant bottom feeding of calendar backs 120 from the initial stacked position on the continuous belts 94 forwardly onto the casing 98. The eccentric 115 is actuated by the rotated crank shaft 116 (Figs. 5 and 6) to reciprocate the rod 113 to move the free end of the arm 112 back and forth about the shaft 92 as the pivot to move the ratchet wheel 110 in a tooth-by-tooth rotative movement to rotate the drums 93 which actuate the belts 94 to feed the calendar backs 120 forwardly from the bottom of the stack. It is undesirable to pile up calendar backs 120 on the casing 98 since too much weight will interfere with moving the lowermost calendar back 120 out from under the stack. Hence, the switch 119 is provided which, upon too many calendar backs moving onto the casing 98, is closed to actuate the solenoid 107 (Figs. 7 and 8) to move the shield 108 clockwise into position for engagement of the arcuate edge of the enlarged portion 108' thereof by the dog 111. As long as the dog 111 is moving back and forth along the arcuate edge 108', it is maintained out of engagement with the teeth of the ratchet wheel 110, and, hence, no more calendar backs 120 are moved forwardly onto the casing 98 until the overcrowded condition is relieved and the switch 119 opened.

The arm 137 of the switch 119 is pivoted counterclockwise by contact therewith of the calendar backs 120, and, therefore, as soon as a sufficient number of calendar backs 120 have been carried forward by the pickup and transfer mechanism 44, the arm 137 will pivot clockwise under the influence of gravity or spring action to break the contacts 138 and 138', thereby de-energizing the solenoid 107 and permitting the shield 108 to be returned to the position shown in Fig. 6 by the action of the spring 109. Manifestly, forward feeding of the calendar backs 120 will be immediately resumed.

The present machine 40 is automatic, and the movement of calendar backs and calendar pads to and the movement of calendar units from the stitching station is continuous. The machine 40 is capable of high speed in the handling of calendar backs and pads and will handle upward of one hundred and fifty units per minute. It is contemplated that calendar backs and calendar pads may be supplied to the machine automatically, although such forms no part of the present invention. It is expected that continuous supplies of calendar backs and pads will be fed to the machine 40 manually. Furthermore, the basket 348 may be replaced, when full, by another basket 348 automatically, although this operation is now performed manually, even though the machine 40 handles calendar units at the rate of upwardly of one hundred and fifty per minute.

The automatic handling of calendar backs and pads in the manner herein disclosed is considered to be broadly new. Furthermore, the several mechanisms which combine to produce the whole combination are considered to be novel with the applicant. It is to be understood that, while the present machine 40 was devised to handle calendar backs and calendar pads, it will equally well handle any other flat articles for joining and stacking.

It is manifest that there has been provided a calendar handling machine which fulfills all of the objects and advantages sought therefor.

It is to be understood that the foregoing description and the accompanying drawings have been given by way of illustration and example. It is also to be understood that changes in form of the several parts, substitution of equivalent elements and steps, and rearrangement of parts and steps, which will be readily apparent to one skilled in the art, are contemplated as within the scope of the present invention, which is limited only by the claims which follow.

What is claimed is:

1. In a device of the kind described, in combination, means for receiving a stack of flat objects such as calendar backs, means for feeding received objects forwardly from the bottom of a received stack to a pickup station, said feeding means including means for disposing a plurality of received objects in lateral offset relation prior to their reaching the pickup station and for moving said offset received objects simultaneously toward the pickup station, means for separating the bottom received object at the pickup station at least in part from the next above received object, means for moving said bottom received object forwardly from beneath other received objects at the pickup station to a stitching station, means for receiving another stack of flat objects such as calendar pads, means for moving a flat object of the second stack to the stitching station into superposed position in respect to a received flat object, and means for moving a stitched unit away from the stitching station.

2. In a machine of the kind described, means for holding a stack of calendar backs, a support forwardly thereof, means for continuously feeding calendar backs forwardly onto the support from the bottom of a stack on the holding means, means for drawing the bottom calendar back of several on the support thereagainst and away from the next calendar back above at least along portions of the rear edge, means engageable with said drawn away portion for moving the bottom calendar back on the support forwardly to a stitching station, and means permitting only one calendar back at a time to pass forwardly from the support.

3. In a machine of the kind described, means for holding a stack of calendar backs, a support forwardly thereof, means for continuously feeding calendar backs forwardly onto the support from the bottom of a stack on the holding means, means for drawing the bottom calendar back of several on the support thereagainst and away from the next calendar back above at least along portions of the rear edge, means for stopping the feeding means upon too many calendar backs being fed onto the support and for maintaining said feeding means inoperative until the condition is relieved, means engageable with said drawn away portion for moving the bottom calendar back on the support forwardly to a stitching station, and means permitting only one calendar back at a time to pass forwardly from the support.

4. In a device of the kind described, pickup mechanism for moving flat objects such as calendar backs between predetermined stations including spaced pairs of reciprocating members, supported guides for said members, means for simultaneously moving forwardly a member of each pair and rearwardly the other member of each pair, each member including means extending during forward movement above the plane of movement of moved flat objects for simultaneously moving one flat object to a predetermined station and a second object from said station, said last means being retractable to a position below the plane of movement of moved flat objects for the rearward movement of said members.

5. In a machine of the kind described, in combination, mechanism for simultaneously moving one calendar back or the like from a work station to a collection station and a second calendar back or the like from a pick-up station to the work station, supporting means upon which calendar backs or the like slide in movement between stations, said mechanism including a reciprocable composite member, means supporting said composite member for forward and rearward movement, said composite member including an elongated base member and an elongated superposed upper member movably connected to said base member, said upper member resting adjacent said base member in rearward movement and being spaced therefrom a predetermined maximum distance in forward movement, said composite member supporting a calendar back pick-up member on the rear end and a calendar back engaging member at the front end, and means for moving said composite member forwardly and rearwardly including means for moving said upper member, said calendar back pickup member, and said calendar back engaging member into raised spaced position relative to said base member prior to forward movement of said composite member and for lowering said upper member during rearward movement, said lowered position of said upper member permitting return rearward movement beneath supported calendar backs or the like.

6. A machine as set forth in claim 5 including a pair of laterally spaced composite members each comprising an upper member and a base member, and means for simultaneously reciprocating the composite members and moving the upper members relative to the base members.

7. A machine as set forth in claim 5 including two pairs of laterally spaced composite members, each composite member comprising an upper member and a lower member, and means for simultaneously reciprocating each pair of composite members and moving the upper members thereof relative to the lower members thereof, said latter means including means for continuously moving said two pairs of composite members so that one pair moves calendar backs or the like forwardly as the other pair returns rearwardly beneath forwardly moving calendar backs or the like so that there is a substantially continuous forward movement of calendar backs or the like when said machine is in operation.

8. A machine as set forth in claim 5 in which said pick-up member is undercut to overlie an engaged calendar back or the like a predetermined small amount to insure retaining of the engaged calendar back or the like, and resilient means mounted on said supporting means at the forward end of said machine engageable and compressible by said upper member in a predetermined final fraction of an inch of forward movement, said resilient means maintaining said upper member raised during the same predetermined fraction of an inch of return movement of said composite member to insure rearward withdrawal of said pick-up member from a calendar back or the like before lowering movement of said upper member to position for rearward movement.

9. In a machine of the kind described, in combination, supporting means for calendar backs or the like, mechanism for simultaneously moving forwardly along said supporting means two longitudinally spaced calendar backs or the like comprising a composite member including a base member and an upper member movably connected to said base member and movable between an upper calendar back or the like engaging position and a lower position, said composite member being reciprocable forwardly and rearwardly, said upper member including means for one of two longitudinally spaced calendar backs or the like, means pivotally connected to said upper member for engaging the other of two longitudinally spaced calendar backs or the like, and means for reciprocating said composite member including means for raising said upper member and said pivotally connected means to calendar back or the like engaging position prior to forward movement and for lowering said upper member and said pivotally connected means during rearward movement.

10. A machine of the kind described in claim 9 including two pairs of laterally spaced composite members, each composite member comprising an upper member and a lower member, and means for simultaneously reciprocating each pair of composite members and moving the upper members thereof relative to the lower members thereof, said latter means including means for continuously moving said two pairs of composite members so that one pair moves calendar backs or the like forwardly as the other pair returns rearwardly beneath forwardly moving calendar backs or the like so that there is a substantially continuous forward movement of calendar backs or the like when said machine is in operation.

11. A machine of the kind described in claim 9 in which said calendar back or the like engaging means of said upper member includes a hook member at the rear end which is formed to overlie an engaged calendar back or the like a predetermined small amount to insure retaining thereof, and resilient means mounted on said supporting means at the forward end of said machine engageable and compressible by said upper member in a predetermined final fraction of an inch of forward movement, said resilient means maintaining said upper member raised during the same predetermined fraction of an inch of return movement of said composite member to insure rearward withdrawal of said hook member from a calendar back or the like before movement of said upper member to position for rearward movement.

12. In a machine of the kind described, in combination, mechanism for supporting a stack of calendar backs or the like and for feeding such calendar backs or the like forwardly to a pick-up station including a driven outstretched endless belt having an upper reach disposed at an angle to the horizontal, a flat horizontal surface disposed adjacent the lower end of said upper reach and extending substantially therebeyond, said upper reach and said surface being adapted cooperatively to receive a stack of calendar backs or the like disposed in parallel, horizontally offset relation up to a predetermined level and in vertical stacked relation above said level, means for driving said belt, whereby the calendar backs or the like disposed in offset relation may be advanced substantially without relative movement therebetween so as successively to reach a pick-up station, said angularly disposed upper reach of said belt permitting forward movement of the lowest calendar back or the like in the vertical group and successively other lowest calendar backs or the like in the vertical group in turn as soon as the lowermost calendar back or the like of the offset group has been moved forwardly to said pick-up position, so that calendar backs or the like are continuously disposed in pick-up position, and means for preventing forward movement of calendar backs or the like above the lowest in the vertical group.

13. Mechanism as described in claim 12 and including a supporting idler wheel under the upper reach of said belt between the ends thereof preventing sagging thereof and insuring accurate forward feeding of calendar backs or the like.

14. Mechanism as described in claim 12 in which said calendar back or the like feeding belt comprises two spaced simultaneously driven belts, and a supporting idler wheel under the upper reach of each belt between the ends thereof preventing sagging thereof and insuring accurate forward feeding of calendar backs or the like.

15. Mechanism as described in claim 12 and including a gate at the forward end of the calendar back or the like pick-up station of a height permitting passage at one time of only a single calendar back or the like.

16. Mechanism as described in claim 12 and including a gate at the forward end of the calendar back or the like pick-up station of a height permitting passage at one time of only a single calendar back or the like, and means for automatically stopping forward feeding movement of said belt upon a predetermined accumulation of calendar backs or the like at the pick-up station and for automatically restarting said belt upon reduction of accumulated calendar backs or the like at the pick-up station.

17. An automatic calendar handling machine comprising, in combination, means for moving a stacked array of calendar backs or the like forwardly from beneath a vertical stack thereof toward a pick-up station for successive disposition of the same at the pick-up station means for moving a bottom calendar back or the like from a pick-up station to a stitching station including a pick-up member, and means for moving a calendar pad or the like to the stitching station in position adjacent to a calendar back or the like, said means for moving a calendar back or the like to the stitching station including a forwardly disposed member for simultaneously moving a stitched calendar unit or the like to a receiving station as the same said means moves a calendar back or the like to the stitching station.

18. The automatic calendar handling machine of claim 17 and including means for separating a portion of the bottom calendar back or the like from the stacked array prior to pickup by said pick-up means to facilitate functioning of said latter means.

LOUIS E. TAYLOR.

References Cited in the file of this patent

UNITED STATES PATENTS

| Number | Name | Date |
|---|---|---|
| 704,444 | Dummer | July 8, 1902 |
| 707,787 | Marresford | Aug. 26, 1902 |
| 1,011,820 | Labombarde | Dec. 12, 1911 |
| 1,078,963 | Sheldon | Nov. 18, 1913 |
| 1,129,456 | Conradi | Feb. 23, 1915 |
| 1,154,968 | Burnham | Sept. 28, 1915 |
| 1,276,528 | Hopping | Aug. 20, 1918 |
| 1,335,556 | Clark | Mar. 30, 1920 |
| 1,514,929 | Ray | Nov. 11, 1924 |
| 1,695,897 | Kristofek | Dec. 18, 1928 |
| 1,841,146 | Ohlig | Jan. 12, 1932 |
| 2,065,487 | Broadmeyer | Dec. 22, 1936 |
| 2,069,397 | Von Barth | Feb. 2, 1937 |
| 2,133,265 | Wolff | Oct. 11, 1938 |
| 2,198,067 | Staude | Apr. 23, 1940 |
| 2,375,989 | Hale | May 15, 1945 |
| 2,384,768 | Rau | Sept. 11, 1945 |
| 2,476,250 | Paulsen | July 12, 1949 |